United States Patent [19]
Diedrichsen et al.

[11] Patent Number: 5,920,313
[45] Date of Patent: *Jul. 6, 1999

[54] METHOD AND SYSTEM FOR ASSOCIATING RELATED USER INTERFACE OBJECTS

[75] Inventors: Jens Diedrichsen, Eastleigh; Simon Richard Hakiel, Landford; Alan Stanley Murphy, Eastleigh; Mark Slade, Romsey, all of United Kingdom

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/655,064

[22] Filed: May 29, 1996

[30] Foreign Application Priority Data

Jun. 1, 1995 [GB] United Kingdom .................... 9511073

[51] Int. Cl.[6] ....................................................... G06F 3/14
[52] U.S. Cl. ........................................... 345/339; 345/343
[58] Field of Search ..................................... 395/339, 340, 395/343, 346, 348, 331, 332, 335, 356; 345/339, 340, 343, 346, 348, 331, 332, 335, 356

[56] References Cited

U.S. PATENT DOCUMENTS

| | | | |
|---|---|---|---|
| 5,305,435 | 4/1994 | Bronson | 395/346 X |
| 5,353,398 | 10/1994 | Kitahara et al. | 395/332 |
| 5,459,825 | 10/1995 | Anderson et al. | 395/133 |
| 5,479,599 | 12/1995 | Rockwell et al. | 395/349 |
| 5,499,334 | 3/1996 | Staab | 395/340 |
| 5,559,948 | 9/1996 | Bloomfield et al. | 345/335 |
| 5,564,002 | 10/1996 | Brown | 395/340 X |
| 5,564,004 | 10/1996 | Grossman et al. | 345/348 |
| 5,572,649 | 11/1996 | Elliott et al. | 395/340 |
| 5,600,346 | 2/1997 | Kamata et al. | 395/344 X |
| 5,694,561 | 12/1997 | Malamud et al. | 345/346 |
| 5,740,390 | 4/1998 | Pickover et al. | 345/348 |
| 5,745,715 | 4/1998 | Pickover et al. | 345/348 |
| 5,754,179 | 5/1998 | Hocker et al. | 345/348 |
| 5,760,774 | 6/1998 | Grossman et al. | 345/348 |

*Primary Examiner*—Matthew M. Kim
*Assistant Examiner*—Crescelle N. dela Torre
*Attorney, Agent, or Firm*—Jeanine S. Ray-Yarletts

[57] ABSTRACT

In a data processing system, a plurality of user interface objects related into groups are displayed on a desktop; when the user selects one object, such selected object is highlighted on the desktop. The objects related to the selected object are then highlighted using a different intensity. The color of the titlebar of each window in addition may be changed associating a different color to each of such groups of related objects. A pushbutton is also provided on such objects for bringing the related objects to the foreground and moving them near to the selected object.

7 Claims, 10 Drawing Sheets

METHOD AND SYSTEM FOR ASSOCIATING RELATED USER INTERFACE OBJECTS

BACKGROUND OF THE INVENTION

The present invention relates to a graphical user interface and particularly, but not exclusively, to a data processing system including a display unit for graphically displaying a plurality of user interface objects, said user interface objects comprising groups of related user interface objects, and pointing means for selecting one of said user interface objects, said selected user interface object being emphasised on said display unit using a first visual cue.

Data processing systems are usually provided with a graphical user interface (GUI) to allow a user to control the computer system and to present the results of user actions on the system display. In a graphical user interface, applications and data are generally presented as objects depicted on a user interface. A user is then provided with a graphical, intuitive interface to a complex data processing system which permits graphic selection of depicted objects and manipulation of applications corresponding to those objects.

Typically the graphical display of the interface is arranged on a screen to resemble a desktop. Displayed information corresponding to multiple applications which are simultaneously invoked and caused to operate is displayed in respective rectangular regions of the screen called windows, resembling a plurality of electronic paper sheets. There may be several windows simultaneously present on the desktop with each window displaying information that is generated by a different application program. Each application program presents information to the user through its window by drawing images, graphics or text within the window region. The user, in turn, communicates with the application by pointing at standard graphical objects in the window with a pointer that is controlled by a pointing device, such as a mouse, and then selecting the objects, or by typing information into a keyboard associated with the monitor. Selection of the objects may be effected by actuating the mouse to move the pointer onto or near the objects and pressing and quickly releasing, i.e. clicking, a button on the mouse, or by manipulating a cursor via the keyboard.

These user interface objects may be easily manipulated utilizing a standard set of interface commands. For example, the user may move the windows around on the display screen, change their sizes and appearances, shrink down a window to an icon, rearrange the objects in relative background/foreground position so as to arrange the desktop in a convenient manner.

There are a number of different graphical user interface environments commercially available which utilize the arrangement described above. These environments include the System 7 operating system developed by Apple Computer, Inc. (System 7 is a trademark of Apple Computer, Inc.), the Windows graphical user interface developed by the Microsoft Corporation (Windows is a trademark of Microsoft Corporation) and the OS/2 Presentation Manager developed by International Business Machines Corporation (OS/2 and Presentation Manager are trademarks of International Business Machines Corporation).

Many applications make use of several user interface objects, typically windows and icons, that are related logically. Such objects are often child objects of a main or parent window object. Different applications can also be organized into groups of applications, each of which are related by function.

A problem in a graphical user interface is that when several applications are opened simultaneously, the desktop may assume a cluttered appearance and it is then very hard to find out which objects are related to which other objects. Association of objects belonging to a particular set is then difficult.

The use of lines, shading, or decoration on the border for indicating families of windows is suggested in "Designing the User Interface—Strategies for Effective Human-Computer Interaction"—Second Edition, Ben Shneiderman, The University of Maryland, Addison-Wesley Publishing Company Inc., 1992, Page 361, FIG. 9.19.

The OS/2 Workplace developed by International Business Machines Corporation features the use of collections of related windows (work area) whose behavior is coordinated. If the user minimizes a work area all windows opened from an object in that work area are removed from the desktop; if a user restores a work area, all windows that were open when the work area was closed are restored to their previous positions. The OS/2 Workplace is described in "OS/2: The Workplace"—M. Tyne, Computer Information Associates, 1992; the work area is described in "Object-Oriented Interface Design: IBM Common User Access Guidelines—The Official Guide", published by QUE, ISBN 1-56529-170-0.

European Patent Application 0 508 927 describes a method for associating dialogs or other windows with the application to which they refer. When a dialog appears, the application to which the dialog belongs can be identified by looking at a reserved area of the screen. It does not differentiate between different instances of the same general windows which are related to each other, within the same primary application. Each of the different instances would have the same icon displayed in the reserved area of the screen.

A drawback of the prior art is that none of the known systems takes into account the scenario when a user is running more than one instance of the same application; in such situation, association of windows belonging to a particular instance of a process is difficult. Actually, the desktop displays several identical windows at the same time, so that the user cannot find out which windows are related to which others. For example, the user would like to use a particular tool related to the window at present selected (active window); such tool produces data that directly affect the content of the active window. If different instances of the same tool are available in the desktop, it is very difficult to find out which is the correct one related to the active window.

In addition, in some of the systems known in the art, when the user clicks on any window he has all the related windows brought to the foreground; these objects cover all other windows, changing significantly the layout of the user's screen even when not required.

The above drawbacks of the prior art are overcome by the invention as claimed.

SUMMARY OF THE INVENTION

The present invention provides a data processing system as set out above which is characterized by means for emphasising on said display unit the user interface objects related to said selected user interface object using a second visual cue.

In a system according to the present invention, the user can always tell which objects are related to the selected window, even if there are more instances of the same application running. If the user would like to use a particular tool producing data that directly affects the selected window, he can then easily find out which is the correct object related to the selected window, even if there are more instances of the same tool on the display.

In addition, it should be noted that the layout of the screen is not affected and no new object hiding part of the screen real-estate is provided.

Different visual cues can be used in order to facilitate association of related windows; for example, different lines or decoration of the border can be used to denote the object related to the selected window. Preferably, said first visual cue consists of highlighting said selected user interface object with a first intensity and said second visual cue consists of highlighting said user interface objects related to said selected user interface object with a second intensity. The highlight method used for the related objects is then a variant of that used to identify the currently selected object, e.g. the same color, but with lighter intensity or shade.

Any number of objects and any kind of set membership relation between them may be supported by the desktop in a data processing system according to the present invention; different data structures (tables, pointers) can be used to implement such set membership relation between objects, either managed by the operating system or by each of the windows. Typically, the data processing system according to the present invention further includes a data structure associated with each of said user interface objects for identifying said groups of related user interface objects, said data structure providing an indication of the parent user interface object and the child user interface objects related to each of said user interface objects.

In a particular embodiment of the present invention, the data processing system further includes means for visually marking said related user interface objects for differentiating all said groups on said display unit. This feature provides a very easy identification of user interface objects which are members of a set, e.g. windows belonging to a particular instance of a process.

Different visual marking can be used in order to facilitate association of related windows; for example, different lines or shading can be used to denote the set membership of related windows. Preferably, said related user interface objects include windows and said means for visually marking associates a related different color with each of said groups, the titlebar of each of said windows being displayed using said related color.

In an advantageous embodiment, the data processing system further includes user operable command means for selectively revealing on said display unit the user interface objects related to said selected user interface object. The user will be then easily able to identify all members of the set to which the currently focal or selected object belongs, even when objects are in the background of the desktop and then hidden by other windows. It should be noted that such command means are operated only following a user request, so that the layout of the screen is not affected when not necessary.

The user operable command means described above can activate different kinds of revealing for the objects related to the selected window. Preferably, said command means brings said user interface objects related to said selected user interface object to the foreground on said display unit. In a different embodiment of the present invention, each of the objects included in the same set as the selected one can be flashed, to identify all members of the set to which the currently focal or selected object belongs.

In a further different embodiment of the present invention, said command means moves said user interface objects related to said selected user interface object near to said selected user interface object on said display unit; particularly, the objects related to the selected window will be cascaded or tiled directly underneath the titlebar of the selected window, or arranged into some other arbitrary configuration specified by the user and stored by the application. This command means then gathers all the related objects together for the user to interact with however he wants. User's work is then facilitated depending on simultaneous visibility of and access to all the objects belonging to the group. It should be noted that none of the methods known in the art provides means for gathering together all the related objects belonging to the same set. Available methods to "tidy up" windows on a desktop, e.g. by cascading or tiling, apply indiscriminately to all objects, and are not systematic with reference to the concept of set membership.

Said command means is provided on the desktop or, preferably, on said user interface objects. Different implementations of such command means can be provided; for example, the user access to this command may be via a pushbutton or a "View" menu provided on the object. In a particular embodiment, such command means are implemented by a "magnet" pushbutton, that is a pushbutton with a magnet drawn on it; this pushbutton actually involve the feature of making each related object to move towards the selected one as if this pushbutton were a real magnet.

Advantageously, the data processing system according to the present invention further includes means for restoring the status of said display unit preceding the use of said command means.

Furthermore, a method for graphically displaying on a display unit a plurality of user interface objects related into groups of related user interface objects is also provided.

BRIEF DESCRIPTION OF THE DRAWINGS

Embodiments of the invention will now be described in detail, by way of example only, with reference to accompanying figures, where.

DESCRIPTION OF THE PREFERRED EMBODIMENT

Figure 1:
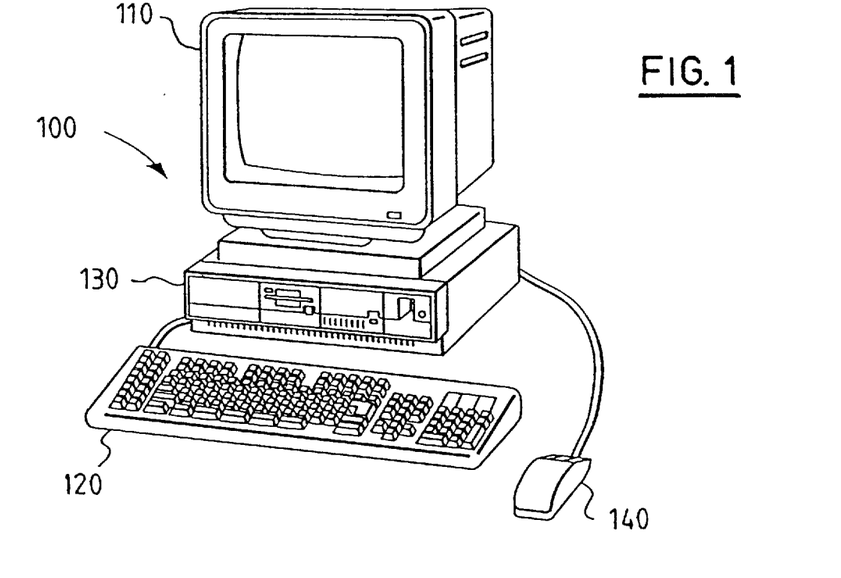
FIG. 1 shows a computer which may be utilized to implement the method and system of the present invention.

With reference now to the figures and in particular with reference to FIG. 1, there is depicted a computer 100 which may be utilized to implement the method and system of the present invention. The computer 100 preferably includes a display unit 110 and a keyboard 120, coupled in a manner well known in the art. Additionally, the computer 100 includes a processor system unit 130 which may serve to mount a fixed disk drive and a diskette drive in addition to the main processor and memory. Further, in order to facilitate the utilization of a graphic user interface, computer 100 preferably includes a graphic pointing device, such as a mouse 140, which may be utilized to manipulate the position of a pointer (not shown) within a visual display on the screen 110.

Those skilled in the art will appreciate that computer 100 may be implemented utilizing any state-of-the-art personal computer, such as the PS/2 Personal Computer manufactured by International Business Machines Corporation. (PS/2 is a trademark of International Business Machines Corporation).

Figure 2:
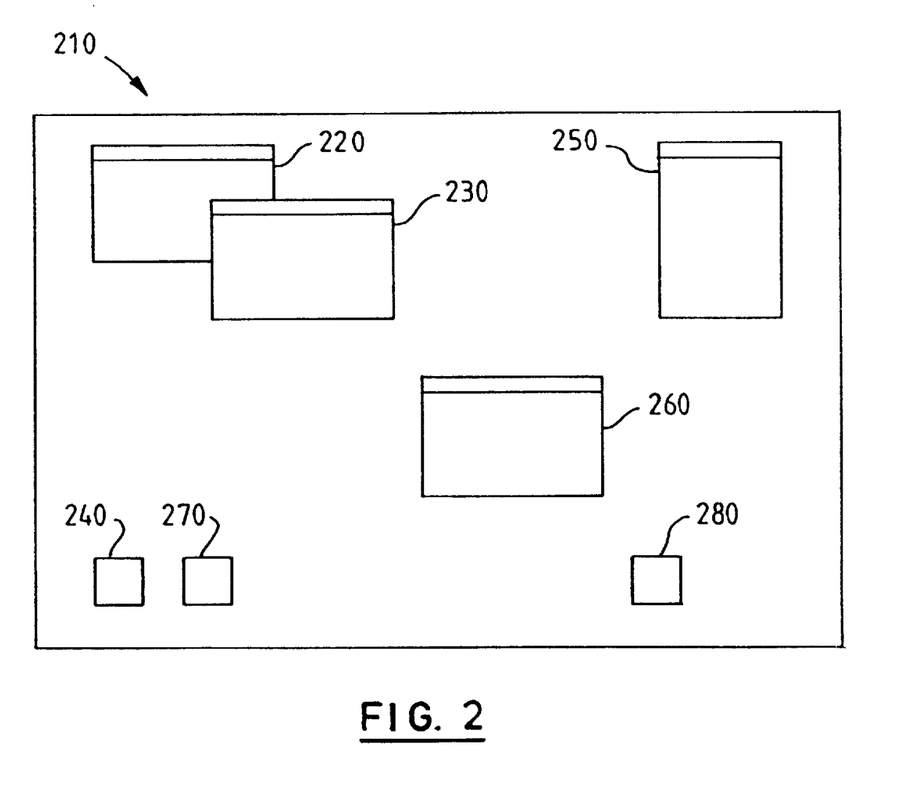
FIG. 2 shows a graphical user interface used with the present invention.

With regard now to FIG. 2, a graphical user interface which may be utilized to implement the method and system of the present invention is shown. The graphical display is typically arranged to resemble a single desktop 210; execution of an application program involves one or more user interface objects represented by windows (220,230) and icons (240). Typically, there may be several other windows 250, 260 and icons 270, 280 simultaneously present on the desktop and displaying information that is generated by different applications.

The window environment is generally part of the operating system software that includes a collection of utility programs for controlling the operation of the computer system 100. The operating system, in turn, interacts with application programs to provide higher level functionality, including a direct interface with the user. Specifically, the application programs make use of operating system functions by issuing task commands to the operating system which then performs the requested task. For example, an application program may request that the operating system display certain information on the window 220 for presentation to the user.

Figure 3:
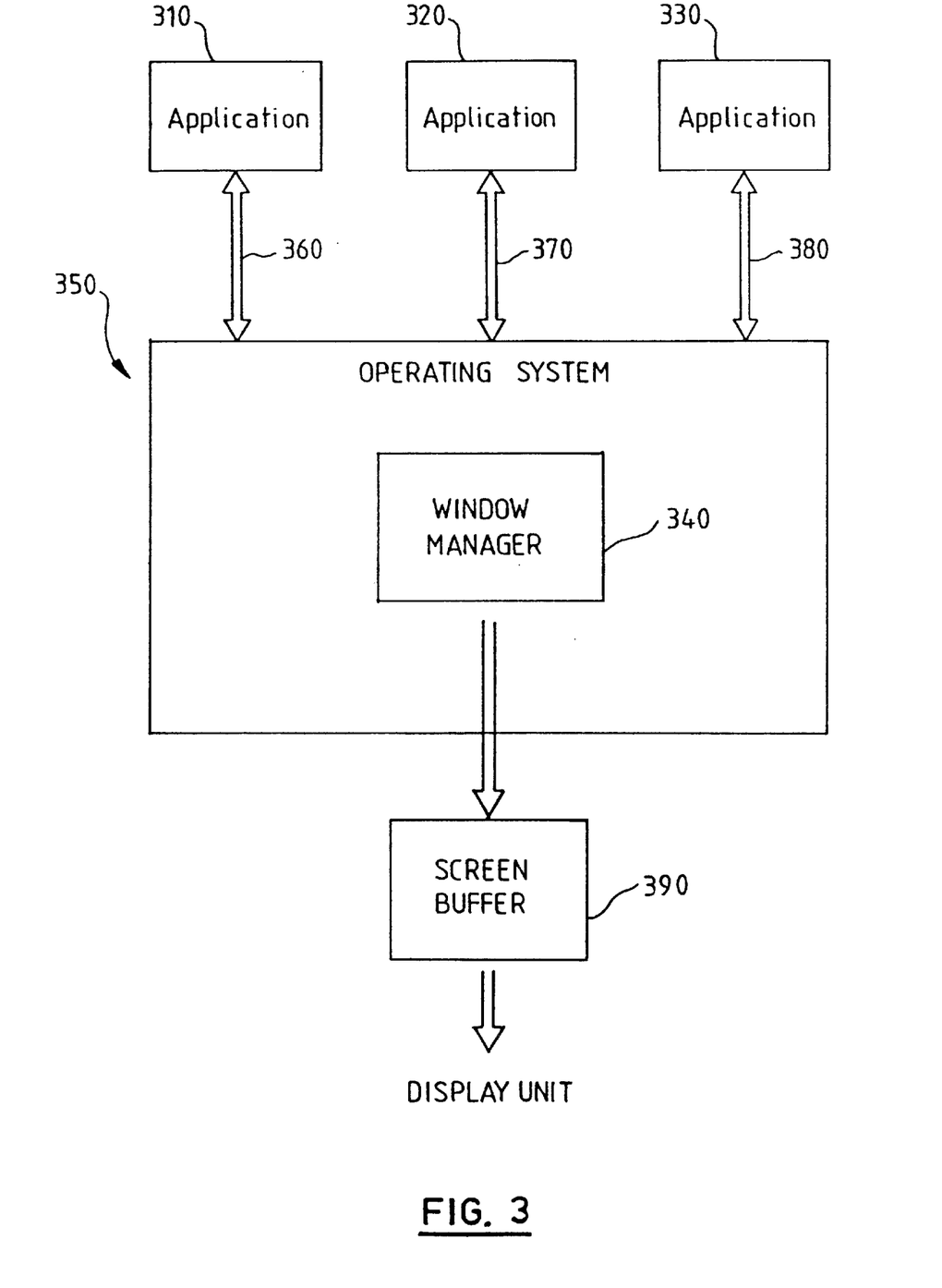
FIG. 3 is a block diagram showing the interactions between a plurality of application programs and the window manager.

FIG. 3 is a schematic illustration of the interaction of a plurality of application programs, shown at 310, 320 and 330 and a window manager 340. The window manager 340 is generally responsible for managing the windows that a user views during operation of the application programs of the computer. That is, it is generally the task of the window manager to keep track of the location and size of the window and window areas which must be drawn and redrawn on the desktop. The window manager is generally well-known and is incorporated in commercially available graphical user interface environments. The window manager 340 is typically located in an operating system 350 which may be executing simultaneously with the application programs on the computer system 100 (FIG. 1). Each program 310, 320 and 330 interfaces with the operating system 350 as illustrated schematically by arrows 360, 370 and 380. In order to display information on a computer screen, application programs 310, 320 and 330 generate and send display requests to the window manager 340 which, in turn, interfaces directly with a screen buffer 390 as illustrated schematically in the figure. The content of the screen buffer 390 is then provided to the display unit 110 (FIG. 1).

Figure 4A:
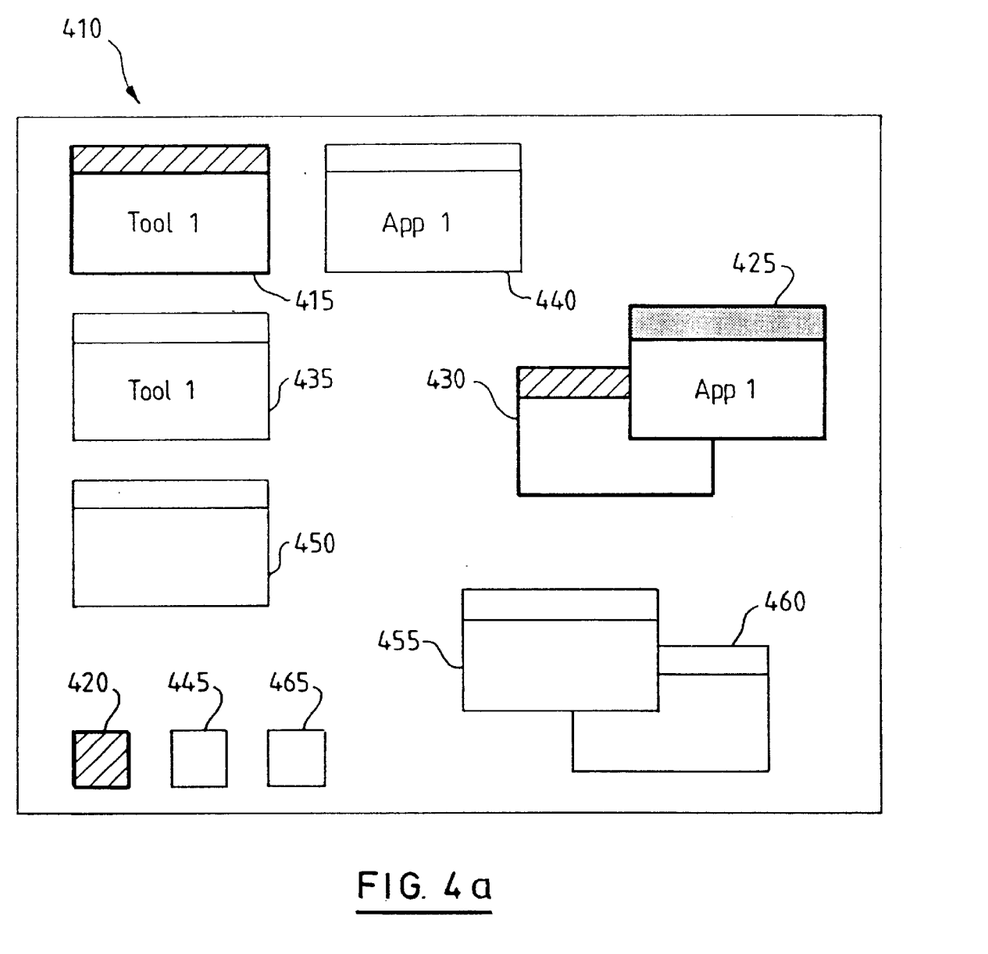
FIGS. 4a and 4b show two different illustrative embodiments of the present invention.

With reference now to FIG. 4a, a first illustrative embodiment of the present invention is depicted. The desktop 410 includes a plurality of user interface objects (windows, icons) referred to at 415–465. Logically related user interface objects are organized into groups. For example, pop-up or child objects 420 and 425 have been created by a parent window 415 and window 430 has been in turn created by window 425; objects 415–430 belonging to the same process instance are then related together in the same group. Analogously, objects 435, 440 and 445 are related by function and parent window 450 is related to child objects 455, 460 and 465 (reduced to an icon). It will be apparent to those skilled in the art that any number of objects and any kind of set membership relation between them may be supported by the desktop 410 in a data processing system according to the present invention; particularly, more instances of the same application can be running, creating more groups of related windows, possibly identical. Referring to FIG. 4a, two instances of the same application (App1) are present on the desktop 410, respectively in window 425 and 440. This application has a tool (Tool1) associated therewith; windows 415 and 435 show two instances of such tool, respectively associated with window 425 and 440.

A window 425 has been selected by the user, i.e. pointing with the mouse onto the object and clicking. The selected object 425 is emphasised on the display using a first visual cue; typically, the selected object 425 is highlighted to indicate the current focal point on the desktop. In the depicted example, the selected window 425 is related to objects 415,420,430 belonging to the same group of user interface objects.

According to the present invention in the system of FIG. 4a, the user interface objects 415,420,430 related to the selected user interface object 425 are emphasised on the display using a different second visual cue. In a preferred embodiment, each of the objects related to the selected windows 425 is transiently highlighted; the highlight method used for the related objects is a variant of that used to identify the currently selected object, e.g. the same color, but with lighter intensity or shade.

Those skilled in the art will appreciate that different visual cues can be used in order to facilitate association of related windows; for example, different lines or decoration of the border can be used to denote the object related to the selected window.

Thus, in a system according to the present invention, the user can always tell which objects are related to the selected window, even if there are more instances of the same application running. In the example depicted in FIG. 4a, the user can then discriminate between the two instances of the same tool (Tool1) associated with the application App1, choosing the correct one (window 415) associated with the selected window 425. It should be noted that this feature does not affect the layout of the screen; in addition, it does not provide any new object associated with each group of related objects that hides a whole rectangle of screen real-estate.

Figure 4B:
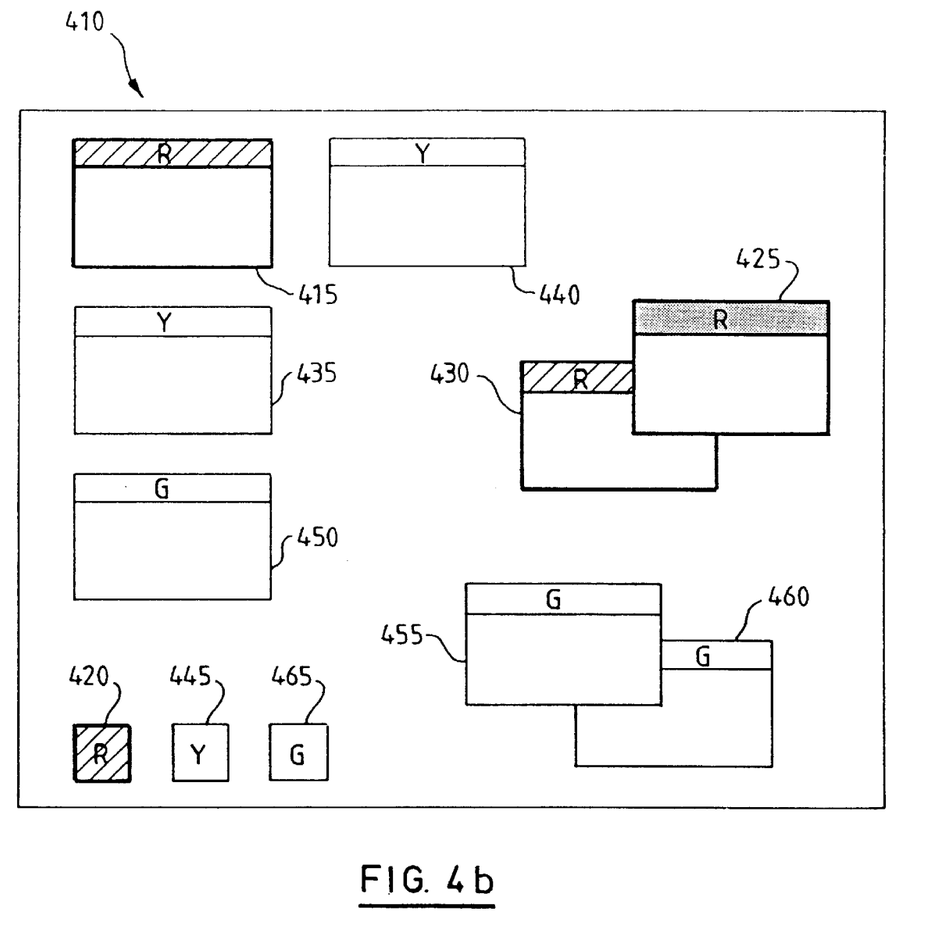

With reference now to FIG. 4b, a second illustrative embodiment of the present invention is shown. In the depicted embodiment, in addition to the first and second visual cue used for the selected object and the objects related thereto, the windows and icons are visually marked on the display unit in order to differentiate all the groups of related objects. As shown in FIG. 4b, each object included in a given set is denoted by a given color associated with the set; different colors are used for every set of user interface objects. For example, a first group 415–430 of objects is denoted by red (R), a second group 435–445 by yellow (Y) and a third group 450–465 by green (G). The depicted embodiment of the present invention provides a very easy identification of user interface objects which are member of a set, e.g. windows belonging to a particular instance of a process. Particularly, if the objects are windows, it is possible to change the color of the titlebar of all related windows to be the same color. The group of windows a particular window belongs to is then indicated by the color of their titlebar, so that the user will be then able to identify which windows are related to each others according to their color.

It should be noted that different visual marking can be used in order to facilitate association of related windows; for example, different lines or shading can be used to denote the set membership of related windows.

With reference to FIGS. 5a, 5b, 5c and 5d, additional features included in different embodiments of the present invention are shown. Such features are used in combination with the different embodiments of the present invention described in FIG. 4a and FIG. 4b; it should be noted that such features can also be implemented independently from the embodiments of the present invention described in the foregoing.

Figure 5A:
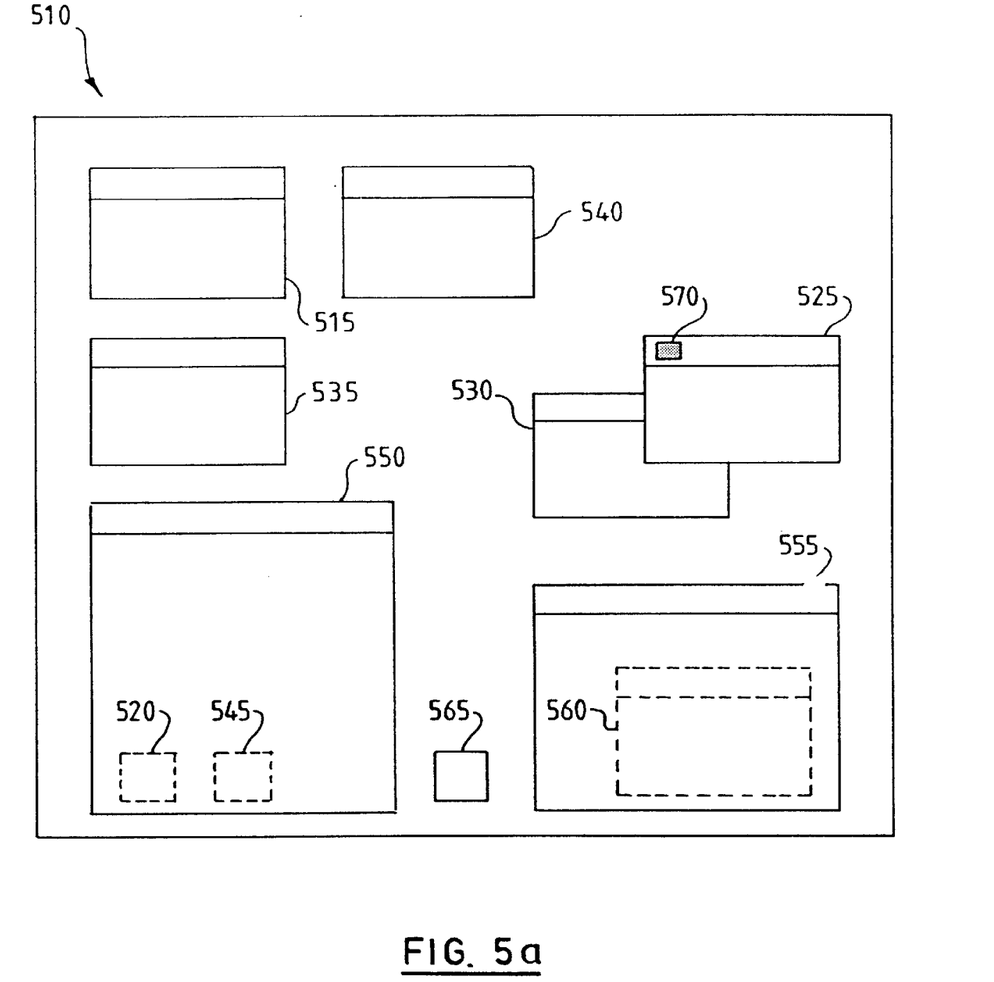
FIGS. 5a, 5b, 5c and 5d show additional features included in different embodiments of the present invention.
Figure 5B:
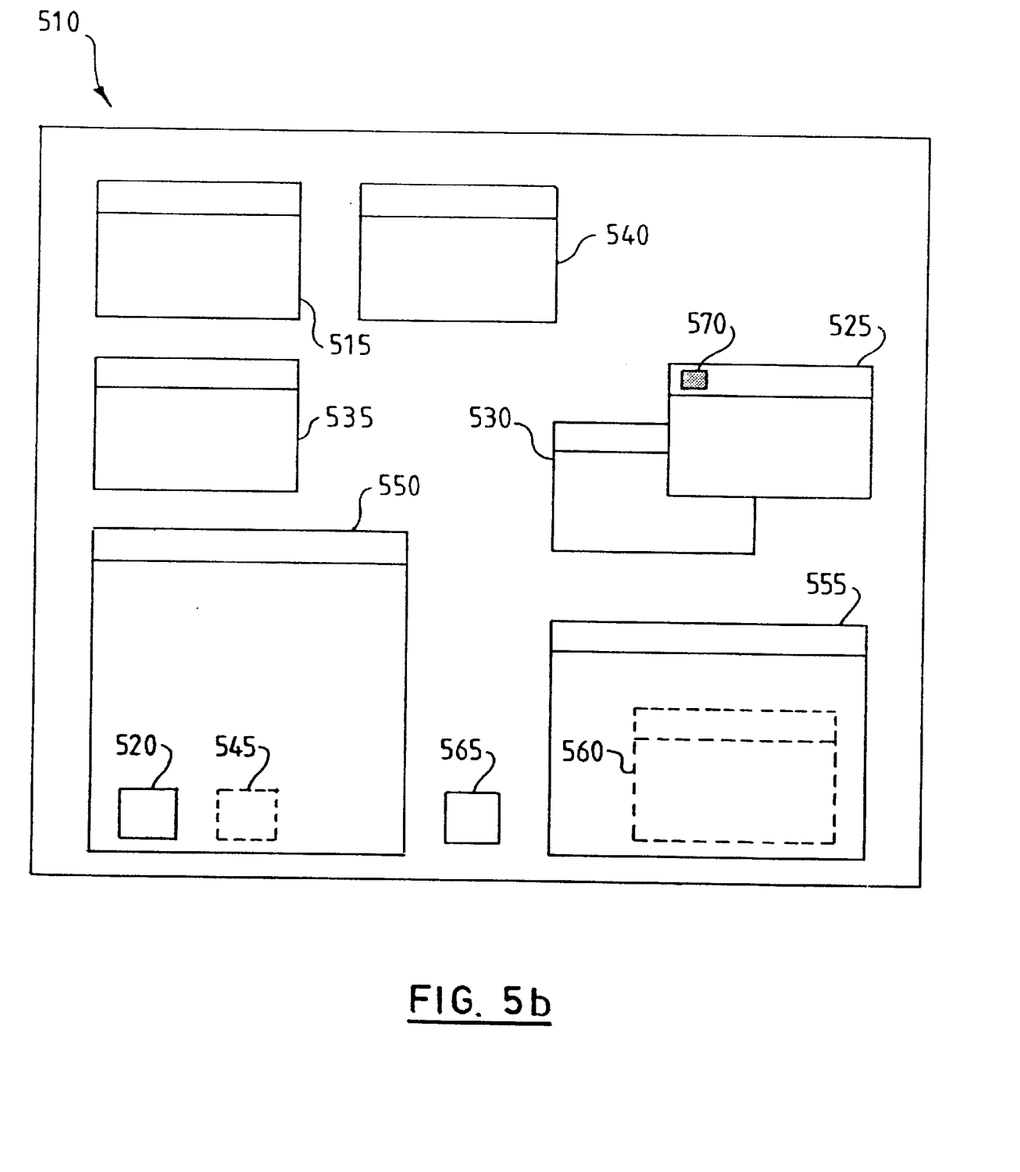

Referring now to FIG. 5a, the desktop 510 includes again a plurality of user interface objects 515–565, logically related into groups 515–530, 535–545 and 550–565. Some user interface objects are in the background, actually covered by other windows. Such hidden objects 520, 545, 560 are shown with dashed lines in FIG. 5a (it should be noted that in a real desktop these objects are not-visible on the display). A window 525 has been selected by the user; in the depicted example, the selected window 525 is related to objects 515, 520 and 530 belonging to the same group of user interface objects.

The system according to the depicted embodiment further includes user operable command means for selectively revealing on the desktop the windows and icons related to the selected object 525; such command means can be provided on the desktop or on the user interface objects. For example, a window is provided with a pushbutton 570 that, when pressed, will cause all the objects related to the window to be revealed on the desktop. The user will be then easily able to identify all members of the set to which the currently focal or selected object belongs. Those skilled in the art will appreciate that different implementations of such command means can be provided without departing from the concept disclosed by the present embodiment of the invention; the user access to this command may be, e.g., via a "View" menu provided on the object. The system according to the present invention provides then a method for immediate location and possible selection of all related objects of the currently selected one.

The user operable command means described above can activate different kinds of revealing for the objects related to the selected window. In a simple embodiment depicted in FIG. 5b, all the objects (520) related to the selected one and hidden on the display by other windows are brought to the foreground, so that user might be able to easily identify all objects related to the selected one. In a different embodiment of the present invention, each of the objects included in the same set as the selected one can be flashed, to identify all members of the set to which the currently focal or selected object belongs.

Figure 5C:
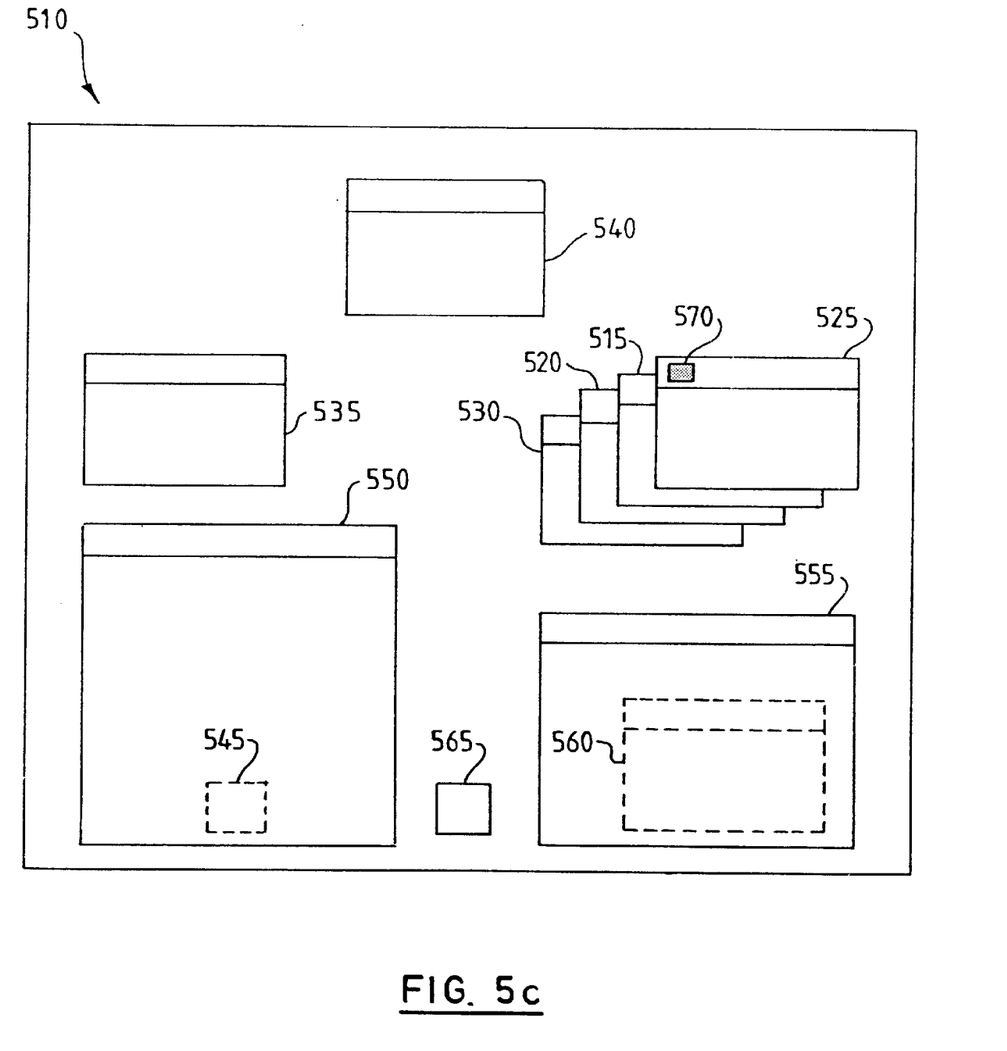
Figure 5D:
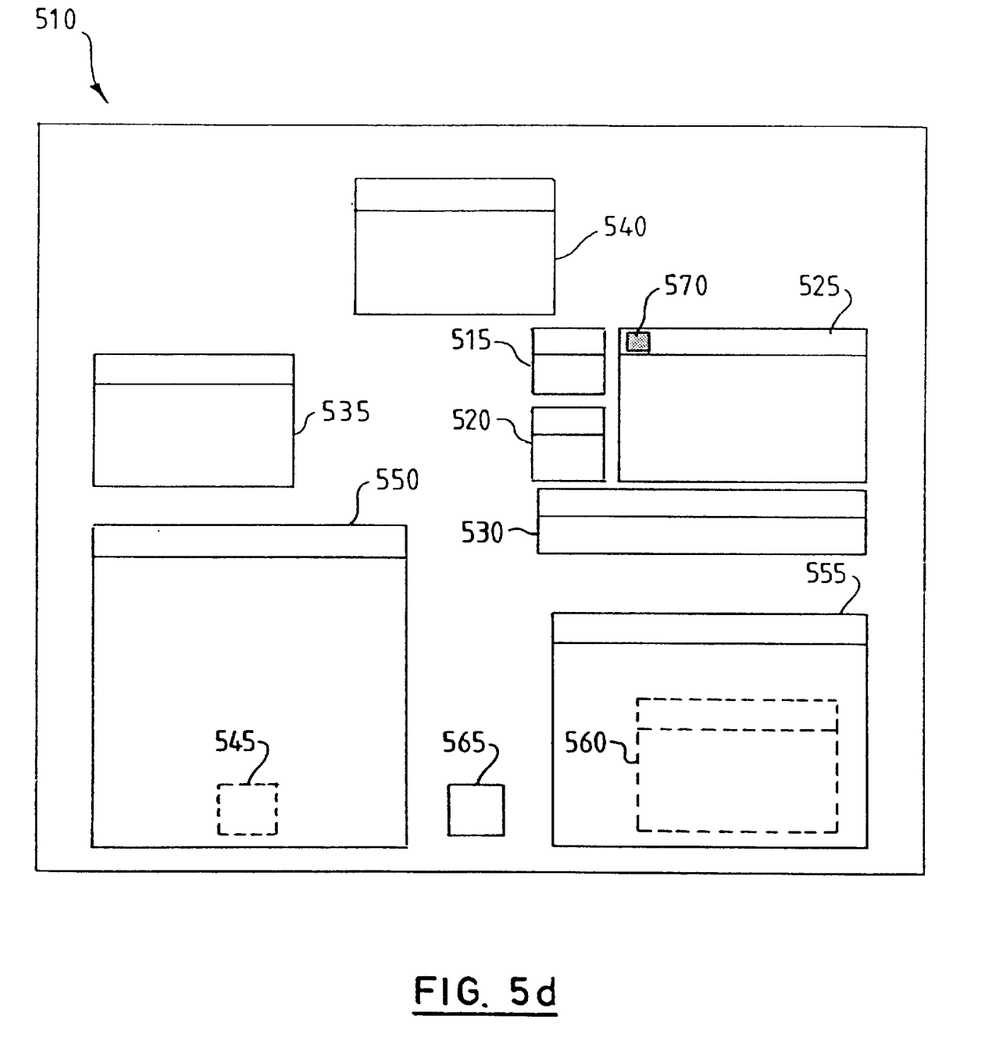

With reference to FIGS. 5c and 5d, further embodiments of the present invention are shown. If the user activates the command means provided on the selected window 525, all the objects related thereto will be brought to the foreground and moved near the selected object, e.g. will be cascaded or tiled directly underneath the titlebar of the window 525 (see FIG. 5c) or arranged into some other arbitrary configuration specified by the user and stored by the application (see FIG. 5d). In the depicted embodiments, the command means are preferably implemented by a "magnet" pushbutton, that is a pushbutton with a magnet drawn on it; this pushbutton actually involves the feature of making each related object move towards the selected one as if this pushbutton were a real magnet.

The magnet pushbutton then gathers all the related objects together for the user to interact with however he wants. The user's work is then facilitated depending on simultaneous visibility of and access to all the objects belonging to the group. It should be noted that available methods to "tidy up" windows on a desktop, e.g. by cascading or tiling, apply indiscriminately to all objects, and are not systematic with reference to the concept of set membership.

The system according to the above described embodiments is provided with an additional "put back" command, in order to restore the previous spatial organisation of the desktop as required. User access to the commands (or methods) is provided for example via a "View" menu with options to tile related objects, to cascade them and to restore previous desktop arrangement.

Figure 6:
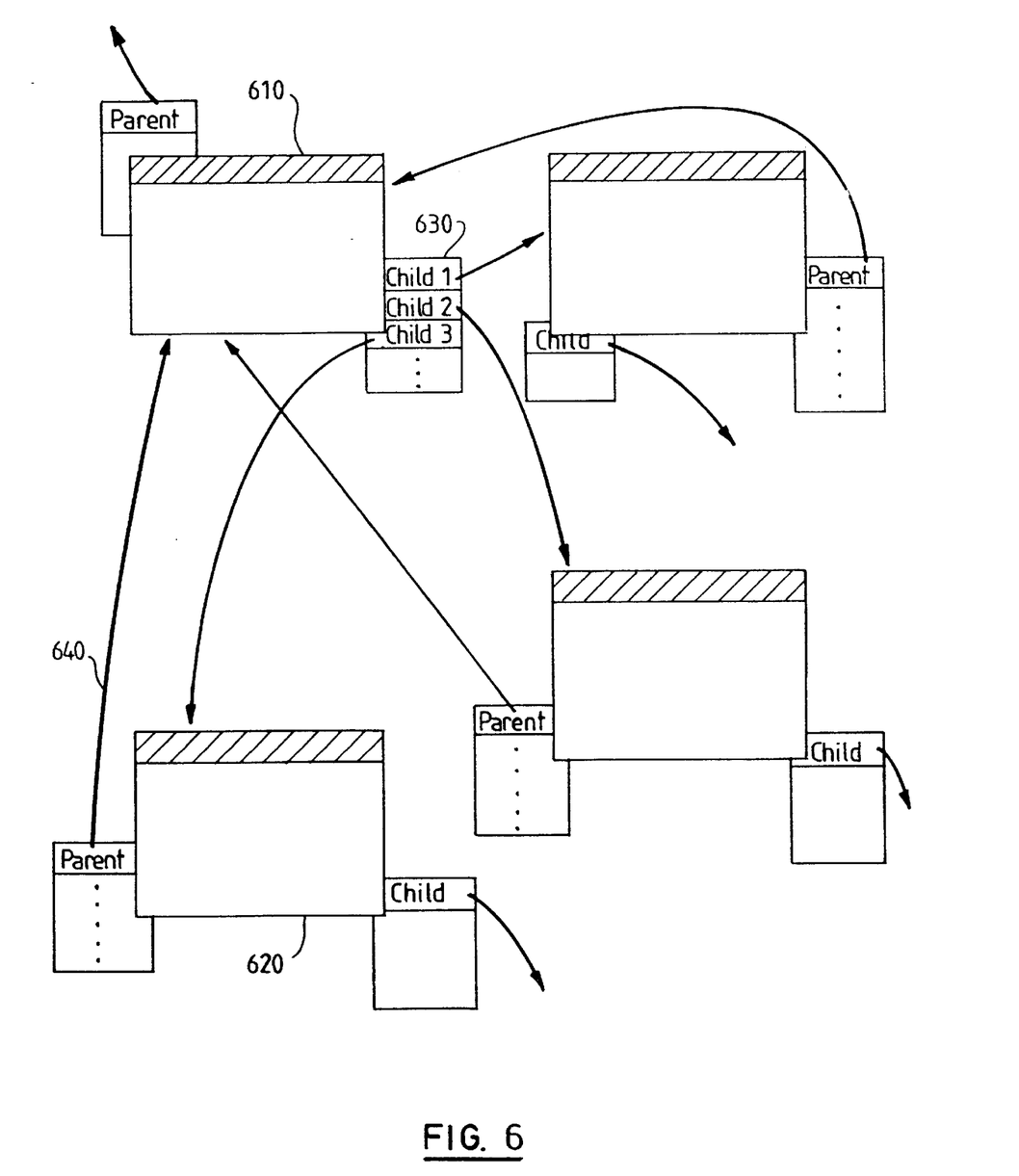
FIG. 6 shows the data structure used to implement the set membership relation.

FIG. 6 shows the data structure used to implement the set membership relation between user interface objects. Every time an application creates a child window 620 from an object 610, it stores a pointer to that object in a private list 630 of child windows; equally, when the child window 620 is created, it is passed a pointer 640 to its parent window. If the child window 620 is destroyed, it will use the pointer 640 to its parent window 610 to call a method removing itself from the list of child window pointers 630. Hence the parent window 610 maintains an up-to-date list of pointers 630 to all its child windows.

As described above, the parent window always knows about any child window it creates, and hence it can call methods on those windows to visually mark them on the display, in order to differentiate the groups of related user interface objects on the desktop; particularly, the parent window can call methods on its child windows to change the color of the window as required. For example, if there is a specific routine in the operating system, or a kernel extension, to issue unique color id's to processes as they are created, then the parent window of that process can use this color id to set the color of any child object it creates. In a different embodiment, the parent window can still just create a random color id from the more than 16 million unique colors typically implemented in an RGB color scheme with 256×256×256 color components.

Figure 7A:
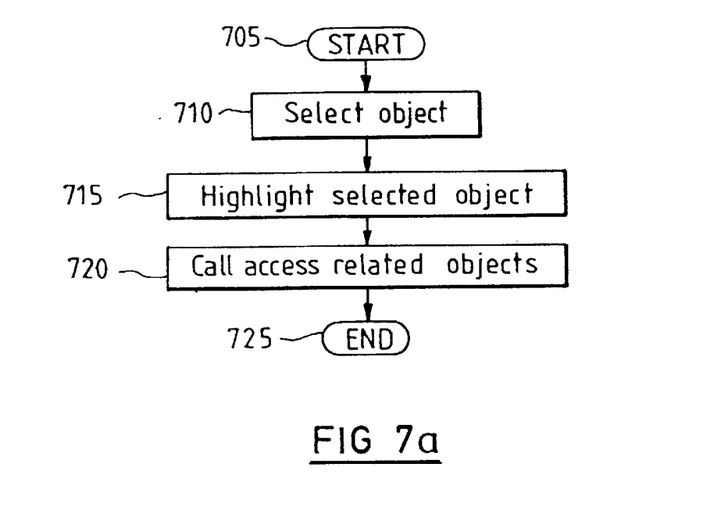
FIGS. 7a and 7b are flow charts illustrating the sequence of steps for implementing particular embodiments of the present invention.

With reference now to FIG. 7a, a flow chart illustrating the sequence of steps for implementing a particular embodiment of the present invention is shown. The routine starts at step 705 and then passes to step 710, where the user selects an object on the desktop by pointing with the mouse onto the object and clicking.

Referring to step 715, the selected object is emphasised on the display using a first visual cue; typically, the selected object is highlighted to indicate the current focal point on the desktop.

The process then passes to block 720, where the process (described in FIG. 7b) for accessing the objects related to the selected window is called; a parameter is passed to this process indicating the type of action required on the related objects, e.g. highlighting with a lighter intensity. The process is then terminated at step 725.

Figure 7B:
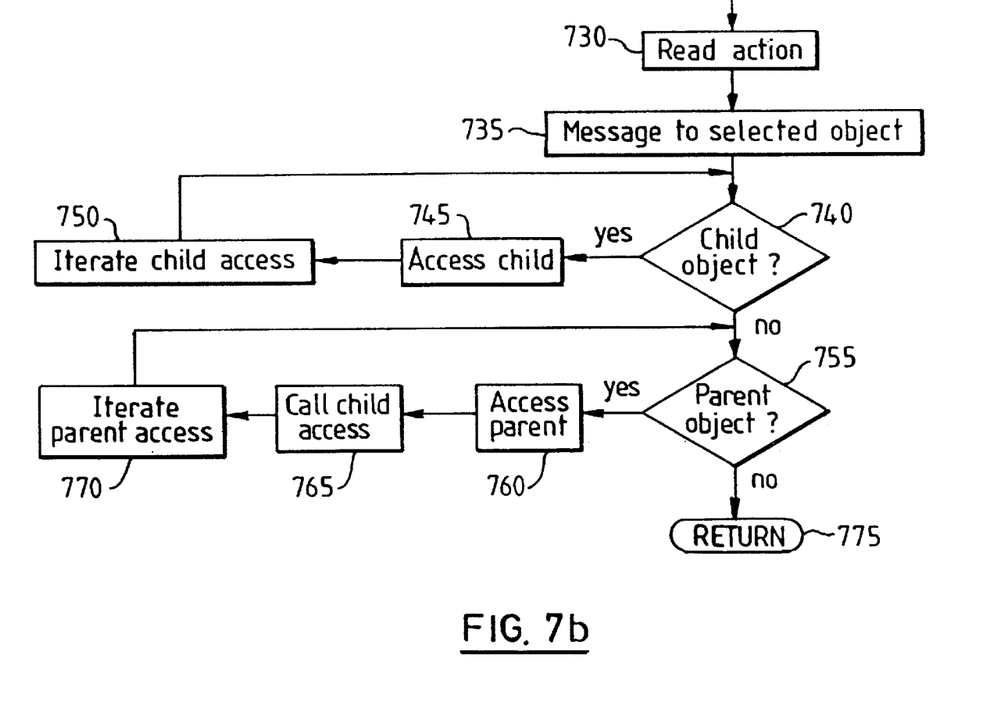

With reference now to FIG. 7b, a flow chart illustrating the process for accessing the objects related to the selected window is depicted.

As described above, this process is typically activated automatically following the user's selection of a window, in order to emphasize (using a different visual cue) the objects related to the selected window on the display. In different embodiments of the present invention, this process is activated by the user through the command means provided on the selected object for revealing the objects related to the selected window. The user's request is typically invoked via the magnet pushbutton described above; however, user access to this command may be provided by a "View" menu on the selected window. In any way, a message corresponding to the invoked command is sent to the window manager.

The process starts at step 730, where the type of action (for example highlight, reveal, move, tile, cascade, restore) required on the objects related to the selected window is read from the parameters passed with the message.

Referring to step 735, the window manager sends a message to the selected window requesting it to access its data structure to determine the user interface objects related thereto; a parameter in the message indicates the action to be performed on the objects related to the selected window.

For this purpose, the selected window accesses its child list at step 740. If the selected window has no child objects related thereto, that is its child list is empty, the process passes to step 755.

If the selected window has at least one child object related thereto, the process passes to step 745, where the selected window locates in turn a child object in its child list and sends a message to it. This message invokes a method on the child window that performs the action required. For example, it highlights the child object on the display using a lighter intensity; in a different embodiment, it first saves the status and position of the object in a private data structure related thereto and then reveals the object on the desktop. The related object is for example brought to the foreground of the desktop and/or flashed; in a different embodiment of the present invention, the child object is brought to the foreground and then tiled or cascaded directly underneath the selected window.

Referring now to step 750, the same method sent by the selected window to its child object in turn iterates the process described in steps 740–750 through the child objects of this window, until all the leaf windows, that is objects without children, are reached.

When all child objects are processed, the flow passes to step 755. If the selected window has no parent object related to it, that is its parent pointer is nil, the process ends at step 775.

If the selected window has a parent object related to it, the process passes to step 760, where the selected window locates its parent object through the related pointer and sends a message to it. This message invokes a method on the parent window that performs the action required. For example, it highlights the parent object on the display using a lighter intensity; in a different embodiment, it first saves the status and position of the object in a private data structure related thereto and then reveals the object on the desktop.

Referring now to step 765, the same method sent by the selected window to its parent object causes the parent object to access its child objects (different from the selected window) invoking the process described in steps 740–750.

Referring now to step 770, the same method sent by the selected window to its parent object in turn iterates the process described in steps 755–770 through the parent objects of this window, until a root window, that is an object without parent, is reached, terminating the process at step 775.

The above described process saves the original position and status of each object on the desktop in a private data structure related thereto before revealing them on the desktop, e.g. before bringing the related objects to the foreground and tiling or cascading them underneath the selected window. If the user issues a put-back command, the window manager can then access all the objects related to the selected window through the same process described above, passing as an action parameter the request to restore the previous status. This process accesses the information stored in the data structure related to each object and then restores the previous status and position of each user interface object on the desktop.

We claim:

1. In a data processing system, a method for graphically displaying on a display unit a plurality of interface objects, said method comprising the steps of:

displaying a first plurality of related objects on said display unit, a relationship of said first plurality characterized by each of said related objects having been displayed by a first instance of an application program, and wherein said objects of said first plurality may be physically dispersed from each other;

displaying a second plurality of related objects on said display unit, a relationship of said second plurality characterized by each of said related objects having been displayed by a second instance of said application program, wherein said objects of said second plurality may be physically dispersed from each other, and wherein at least one of said objects of said second plurality is identical to a corresponding at least one object of said first plurality;

selecting any of said objects of said first plurality;

accessing, by a user of said system, a command means located on said selected object, said accessing provided using a graphical representation on said selected object, said representation designated as usable for requesting a selective revealing of all other non-selected objects of said first plurality;

locating, responsive to said accessing, all said non-selected objects of said first plurality; and selectively revealing said located objects on said display unit using a visual cue, said selective revealing serving to distinguish said first plurality from said second plurality even if any of said related objects of said first plurality may have been obscured on said display unit, and irrespective of a location of a cursor on said display unit.

2. A data processing system, comprising:

a display unit for graphically displaying a plurality of user interface objects;

a first instance of an application program;

a first plurality of related objects displayed on said display unit, a relationship of said first plurality characterized by each of said related objects having been displayed by said first instance, and wherein said objects of said first plurality may be physically dispersed from each other;

a second instance of said application program;

a second plurality of related objects displayed on said display unit, a relationship of said second plurality characterized by each of said related objects having been displayed by said second instance, wherein said objects of said second plurality may be physically dispersed from each other, and wherein at least one of said objects of said second plurality is identical to a corresponding at least one object of said first plurality;

pointing means for selecting any of said objects of said first plurality;

command means located on said selected object, wherein access to said command means is provided using a graphical representation on said selected object, said representation designated as usable for requesting a selective revealing of all other non-selected objects of said first plurality;

locating means, responsive to operation of said command means by a user of said system, for locating all said non-selected objects of said first plurality; and selective revealing means for revealing said located objects on said display unit using a visual cue, said selective revealing serving to distinguish said first plurality from said second plurality even if any of said related objects of said first plurality may have been obscured on said display unit, and irrespective of a location of a cursor on said display unit.

3. The system according to claim 2, wherein said visual cue comprises moving said located objects near to said selected object on said display unit.

4. The system according to claim 2, wherein said visual cue comprises tiling said located objects around said selected object on said display unit.

5. The system according to claim 2, wherein said visual cue comprises cascading said located objects under said selected object on said display unit.

6. The system according to claim 2, wherein said visual cue comprises visually flashing said located objects without moving said located objects on said display unit.

7. The system according to claims 3, 4, or 5, further characterized by having a status and a position for all said objects of said first plurality, and further comprising:

means for saving said status and said position in response to operation of said command means, prior to operation of said selective revealing means; and means for restoring said status and said position in response to a request from said user, following use of said selective revealing means.

\* \* \* \* \*